US011543906B2

(12) United States Patent
Lee et al.

(10) Patent No.: US 11,543,906 B2
(45) Date of Patent: Jan. 3, 2023

(54) ELECTRONIC DEVICE WITH TOUCH SENSING DEVICES

(71) Applicant: Samsung Electro-Mechanics Co., Ltd., Suwon-si (KR)

(72) Inventors: Gye Won Lee, Suwon-si (KR); Hee Sun Oh, Suwon-si (KR); Chang Ju Lee, Suwon-si (KR); Jong Yun Kim, Suwon-si (KR); Hong Seok Lee, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 0 days.

(21) Appl. No.: 17/382,789

(22) Filed: Jul. 22, 2021

(65) Prior Publication Data

US 2022/0300133 A1    Sep. 22, 2022

(30) Foreign Application Priority Data

Mar. 22, 2021    (KR) ........................ 10-2021-0036779

(51) Int. Cl.
*G06F 3/041*    (2006.01)
*G06F 3/044*    (2006.01)

(52) U.S. Cl.
CPC ........ *G06F 3/04144* (2019.05); *G06F 3/0445* (2019.05)

(58) Field of Classification Search
CPC ................. G06F 3/044; G06F 3/04144; G06F 3/0414–04146; G06F 3/041–0445
See application file for complete search history.

(56) References Cited

U.S. PATENT DOCUMENTS

| 10,921,920 | B1* | 2/2021 | Rosenberg | G06F 3/04845 |
| 2011/0122085 | A1* | 5/2011 | Chang | G06F 1/1692 |
| | | | | 345/174 |
| 2021/0021264 | A1* | 1/2021 | Ji | G06F 3/0416 |
| 2021/0089187 | A1* | 3/2021 | Hong | G06F 3/046 |
| 2022/0011899 | A1* | 1/2022 | Kim | G06F 3/0418 |

FOREIGN PATENT DOCUMENTS

| JP | 2012-168747 A | 9/2012 |
| KR | 10-2149385 B1 | 8/2020 |
| KR | 102149385 B1 * | 8/2020 |
| KR | 10-2022-0032449 A | 3/2022 |

* cited by examiner

*Primary Examiner* — Temesghen Ghebretinsae
*Assistant Examiner* — Ivelisse Martinez Quiles
(74) *Attorney, Agent, or Firm* — NSIP Law

(57) ABSTRACT

A touch sensing device employed in an electronic device having a housing including a plurality of touch members, includes a touch sensing unit disposed in the housing and including a plurality of touch sensors configured to perform touch sensing based on a touch applied to any one or any two or more of the plurality of touch members; an oscillation circuit unit configured to generate a plurality of touch sensing signals based on the touch sensing; and a signal processor configured to perform a slide mode, when any one of the plurality of touch sensing signals is a slide mode start touch, to determine whether a slide touch pattern input based on the plurality of touch sensing signals is a preset slide touch pattern.

18 Claims, 16 Drawing Sheets

SLIDE TOUCH PATTERN 1
<TM1→TM2→TM3>

SLIDE TOUCH PATTERN 2
<TM3→TM2→TM1>

ELECTRONIC DEVICE WITH TOUCH SENSING DEVICES

CROSS-REFERENCE TO RELATED APPLICATION(S)

This application claims the benefit of priority to Korean Patent Application No. 10-2021-0036779 filed on Mar. 22, 2021 in the Korean Intellectual Property Office, the disclosure of which is incorporated herein by reference in its entirety.

BACKGROUND

1. Field

The present disclosure relates to an electronic device with touch sensing devices.

2. Description of Related Art

In general, wearable devices have become thinner, simpler, and implemented with sleeker, more elegant designs. Thus, existing mechanical switches are being eliminated, along with the implementation of dustproofing and waterproofing technologies, as well as the development of an integrated model with a smooth design.

Currently, technologies such as touch on metal (ToM) technology that implements touch inputs on metal, capacitor sensing technology using touch panels, micro-electro-mechanical-system (MEMS), and micro strain gauges are being developed. Furthermore, a force touch function is also being developed.

In the case of an existing mechanical switch, large-sized mechanical switches having a large internal space are required to implement the functions of the switches. Thus, the exterior of the wearable device may not be sleek or elegant due to protrusions on an outer surface of a case or the structure not being integrated with the external case, and the wearable device may occupy a relatively large space.

In addition, there is a risk of electric shocks due to direct contact with a mechanical switch that is electrically connected. In particular, there is a disadvantage in that it may be difficult to obtain a waterproof and dustproof construction of the wearable device due to the structural characteristics of the mechanical switch. In order to solve this disadvantage, an electronic touch sensing device has been developed.

In a conventional electronic touch sensing device, there may be a problem in that a pattern of a slide touch in which a touch is continuously input may not be recognized.

In particular, KR Patent Publication No. 10-2149385 has disclosed a technology for recognizing a slide touch. However, there were problems of not recognizing a pattern of a slide touch. In addition, a pattern recognition technology for a slide touch has not been disclosed in a device, including a hybrid sensor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a touch sensing device employed in an electronic device having a housing including a plurality of touch members, includes a touch sensing unit disposed in the housing and including a plurality of touch sensors configured to perform touch sensing based on a touch applied to any one or any two or more of the plurality of touch members; an oscillation circuit unit configured to generate a plurality of touch sensing signals based on the touch sensing; and a signal processor configured to perform a slide mode, when any one of the plurality of touch sensing signals is a slide mode start touch, to determine whether a slide touch pattern input based on the plurality of touch sensing signals is a preset slide touch pattern.

The touch sensing unit may be further configured to perform capacitive sensing and inductive sensing based on the touch applied to the plurality of touch members. The oscillation circuit unit may be further configured to generate a plurality of contact sensing signals based on the capacitive sensing, and a plurality of force sensing signals based on the inductive sensing. The signal processor may be further configured to determine an input force-touch as the slide mode start touch when a magnitude of any one of the plurality of force sensing signals exceeds a slide mode threshold value.

The oscillation circuit unit may comprise either one or both of a first oscillation circuit and a second oscillation circuit. The first oscillation circuit may be configured to generate a first contact sensing signal based on capacitive sensing of a first touch sensor included in the touch sensing unit, and a first force sensing signal based on inductive sensing of the first touch sensor, and the second oscillation circuit may be configured to generate a second contact sensing signal based on capacitive sensing of a second touch sensor included in the touch sensing unit, and a second force sensing signal based on inductive sensing of the second touch sensor.

The slide mode threshold value may be set to be higher than an individual force threshold value.

The signal processor may be further configured to determine an input touch as the slide mode start touch when a retention time period in which an input touch sensing signal exceeding the slide mode threshold value exceeds a retention reference time period.

The signal processor may be further configured to perform a function matching the slide touch pattern, when the slide touch pattern may be the preset slide touch pattern, while performing the slide mode.

The touch sensing device may be configured to process execution of a corresponding camera application software, and any one or any two or more of a flash function, a zoom function, and a camera shutter function, as a camera function based on the touch to a subset of the plurality of touch members, when the slide touch pattern corresponds to a preset camera mode, while performing the slide mode.

The touch sensing device may be configured to process execution of a corresponding game application software, and a corresponding function of a corresponding game based on the touch to a subset of the plurality of touch members, when the slide touch pattern corresponds to a preset game mode, while performing the slide mode.

Each of the plurality of touch sensors may include an insulating member disposed in the housing; a capacitive pad mounted on a first substrate disposed on one side of the insulating member opposing the housing, and configured to sense a contact-touch through the plurality of touch members; a sensing coil mounted on a second substrate, disposed on another side of the insulating member, configured to sense a force-touch through the plurality of touch members, wherein the second substrate may be electrically connected to the first substrate; and a conductor member spaced apart from the sensing coil by a predetermined interval for force sensing through the sensing coil.

Each of the plurality of touch sensors may include an insulating member disposed opposite to an inner side of the housing and including one surface opposing the inner side of the housing; a capacitive pad mounted on a first substrate disposed on an inner surface of the housing and disposed between the first substrate and the insulating member to sense a contact-touch through the plurality of touch members; a conductor member disposed on another surface of the insulating member; and a sensing coil spaced apart from the conductor member, disposed on a second substrate, configured to sense a force-touch through the plurality of touch members, wherein the second substrate may be electrically connected to the first substrate.

In another general aspect, an electronic device includes a housing including a plurality of touch members; a touch sensing unit, disposed in the housing, comprising a plurality of touch sensors configured to perform touch sensing based on a touch applied to any one or any two or more of the plurality of touch members; an oscillation circuit unit configured to generate a plurality of touch sensing signals based on the touch sensing; and a signal processor configured to perform a slide mode, when any one of the plurality of touch sensing signals is a slide mode start touch, to determine whether a slide touch pattern input based on the plurality of touch sensing signals is a preset slide touch pattern.

The touch sensing unit may be further configured to perform capacitive sensing and inductive sensing, based on the touch applied to the plurality of touch members. The oscillation circuit unit may be further configured to generate a plurality of contact sensing signals based on the capacitive sensing, and a plurality of force sensing signals based on the inductive sensing. The signal processor may be further configured to determine an input force-touch as the slide mode start touch, when a magnitude of any one of the plurality of force sensing signals exceeds a slide mode threshold value.

The oscillation circuit unit may include either one or both of a first oscillation circuit and a second oscillation circuit. The first oscillation circuit may be configured to generate a first contact sensing signal based on capacitive sensing of a first touch sensor included in the touch sensing unit, and a first force sensing signal based on inductive sensing of the first touch sensor. The second oscillation circuit may be configured to generate a second contact sensing signal based on capacitive sensing of a second touch sensor included in the touch sensing unit, and a second force sensing signal based on inductive sensing of the second touch sensor.

The slide mode threshold value may be set to be higher than an individual force threshold value.

The signal processor may be further configured to determine an input touch as the slide mode start touch when a retention time period in which an input touch sensing signal exceeding the slide mode threshold value exceeds a retention reference time period.

The signal processor may be further configured to perform a function matching the slide touch pattern, when the slide touch pattern may be the preset slide touch pattern, while performing the slide mode.

The touch sensing device may be configured to process execution of a corresponding camera application software, and any one or any two or more of a flash function, a zoom function, and a camera shutter function, as a camera function based on the touch to a subset of the plurality of touch members, when the slide touch pattern corresponds to a preset camera mode, while performing the slide mode.

The touch sensing device may be configured to process execution of a corresponding game application software, and a corresponding function of a corresponding game based on the touch to a subset of the plurality of touch members, when the slide touch pattern corresponds to a preset game mode, while performing the slide mode.

Each of the plurality of touch sensors may include an insulating member disposed in the housing; a capacitive pad mounted on a first substrate disposed on one side of the insulating member opposing the housing, and configured to sense a contact-touch through the plurality of touch members; a sensing coil mounted on a second substrate, disposed on another side of the insulating member, configured to sense a force-touch through the plurality of touch members, wherein the second substrate may be electrically connected to the first substrate; and a conductor member spaced apart from the sensing coil by a predetermined interval for force sensing through the sensing coil.

Each of the plurality of touch sensors may include an insulating member disposed opposite to an inner side of the housing and including one surface opposing the inner side of the housing; a capacitive pad mounted on a first substrate disposed on an inner surface of the housing and disposed between the first substrate and the insulating member to sense a contact-touch through the plurality of touch members; a conductor member disposed on another surface of the insulating member; and a sensing coil spaced apart from the conductor member, disposed on a second substrate, configured to sense a force-touch through the plurality of touch members, wherein the second substrate is electrically connected to the first substrate.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
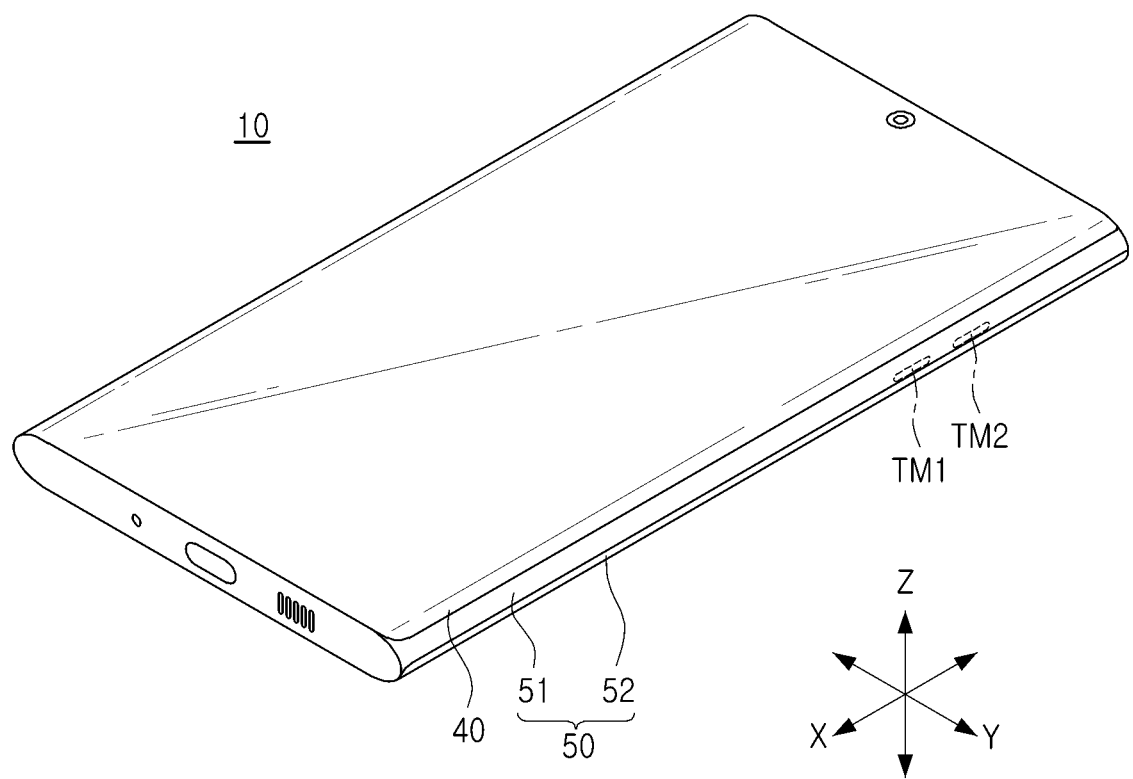
FIG. 1 is a view illustrating an electronic device according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
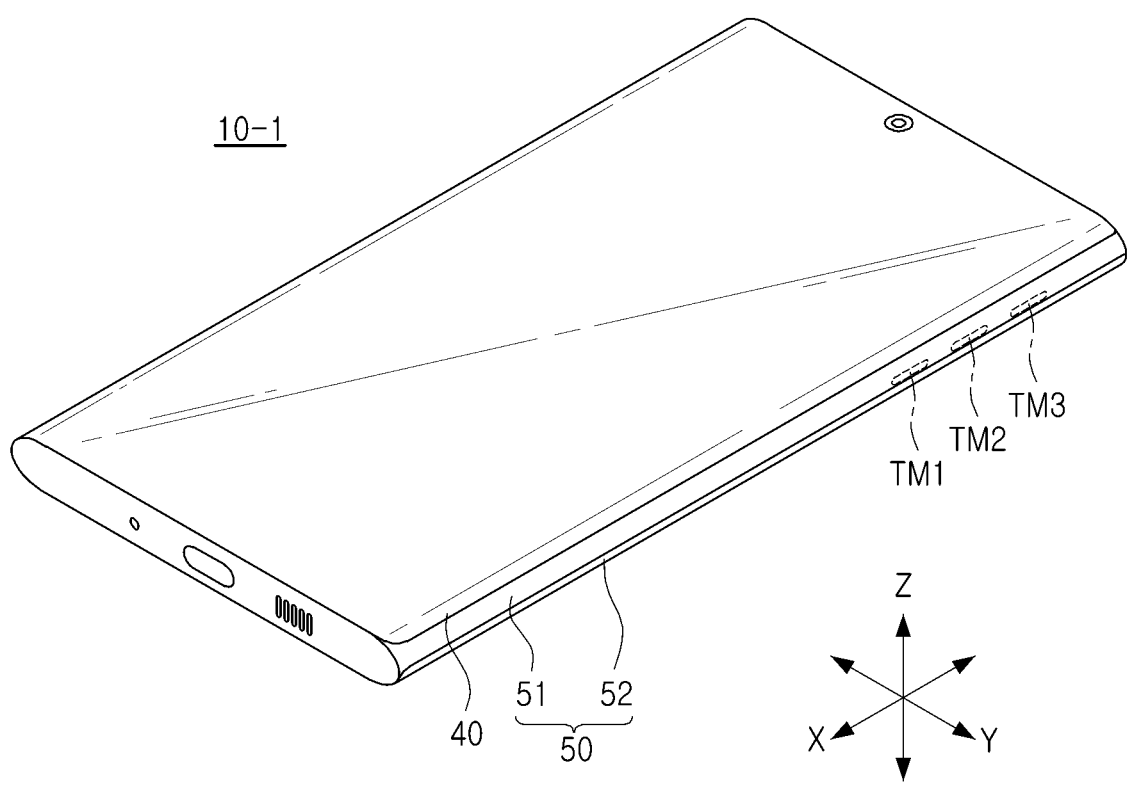
FIG. 2 is a view illustrating an electronic device according to an embodiment of the present disclosure.

FIG. 1 is a view illustrating an electronic device according to an embodiment of the present disclosure, and FIG. 2 is a view illustrating an electronic device according to an embodiment of the present disclosure.

Referring to FIGS. 1 and 2, an electronic device 10 according to an embodiment of the present disclosure may include a front display 40 and a housing 50.

The housing 50 may include a side cover 51 and a rear cover 52. The side cover 51 may include a structure extending from the outside to the inside. For example, the side cover 51 may be formed of a conductive material such as metal, and the rear cover 52 may be made of an insulating material such as glass, but are not limited thereto.

For example, the housing 50 may include a first touch member TM1 and a second touch member TM2, arranged to be spaced apart from each other.

The first and second touch members TM1 and TM2 may be disposed on either one or both of the side cover 51 and the rear cover 52.

Referring to FIG. 1, an electronic device 10 may include a first touch member TM1 and a second touch member TM2, arranged on a side cover 51 of a housing 50.

Referring to FIG. 2, an electronic device 10 may include a first touch member TM1, a second touch member TM2, and a third touch member TM3, arranged on a side cover 51 of a housing 50.

Referring to FIGS. 1 and 2, it can be seen that the electronic device 10 may include two or more touch members. The plurality of touch members are illustrated as an example disposed on the side cover 51 in FIGS. 1 and 2, but are not limited thereto, and may be disposed on either one or both of the side cover 51 and the rear cover 52 of the housing 50.

For example, in FIGS. 1 and 2, an X-axis may be disposed in a length direction of the electronic device 10, a Y-axis may be disposed in a width direction of the electronic device 10, and a Z-axis may be disposed in a thickness direction of the electronic device 10.

In addition, the electronic device 10 may include a touch sensing device 100 (e.g., in FIGS. 3 and 4) disposed in a plurality of touch members TM1, TM2, . . . , and including a touch sensor corresponding to each of the plurality of touch members. The touch sensing device 100 (e.g., in FIGS. 3 and 4) will be described with reference to FIGS. 3 and 16.

A touch may refer to a contact-touch without force and a force-touch with force in this document.

For each of the drawings of the present disclosure, unnecessarily duplicated descriptions may be omitted for the same reference numerals and components having the same functions, and possible differences for each of the drawings may be described.

Figure 3:
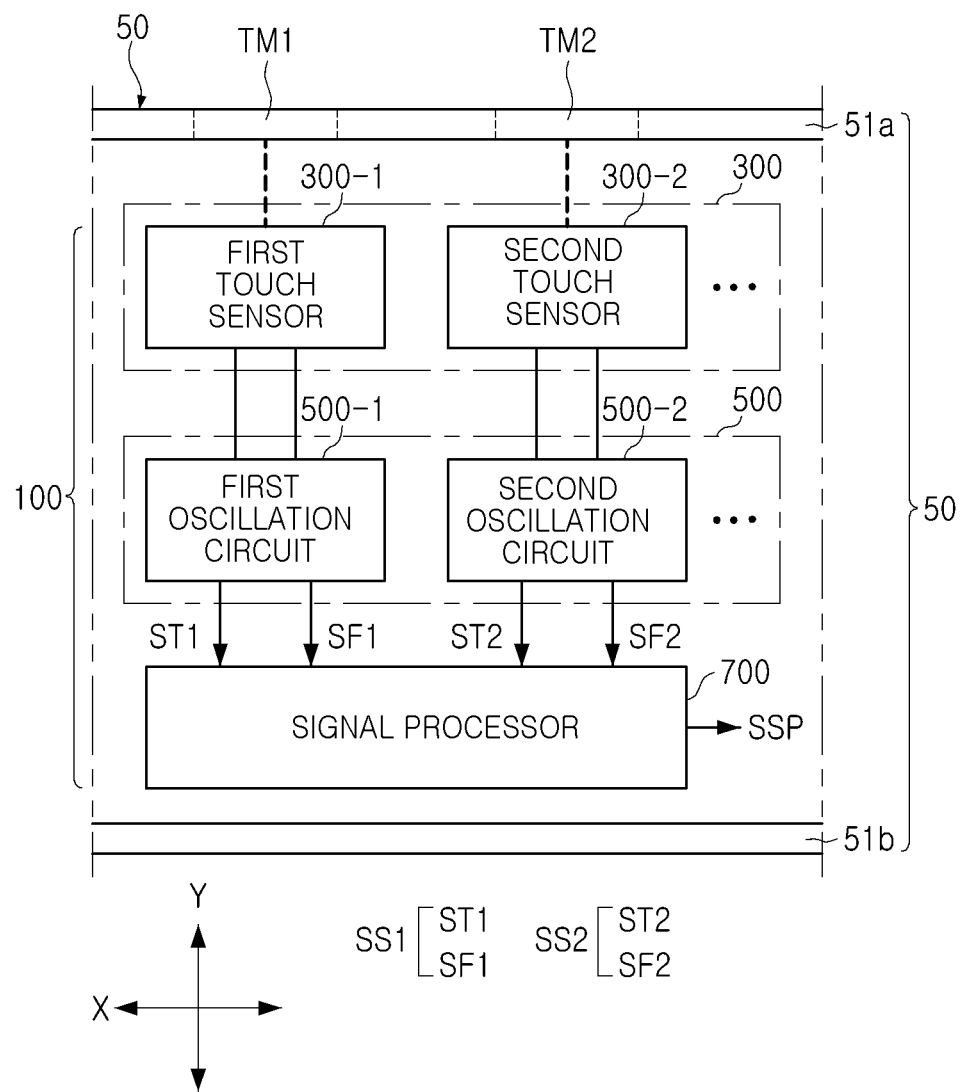
FIG. 3 is a view illustrating a touch sensing device according to an embodiment of the present disclosure.
Figure 4:
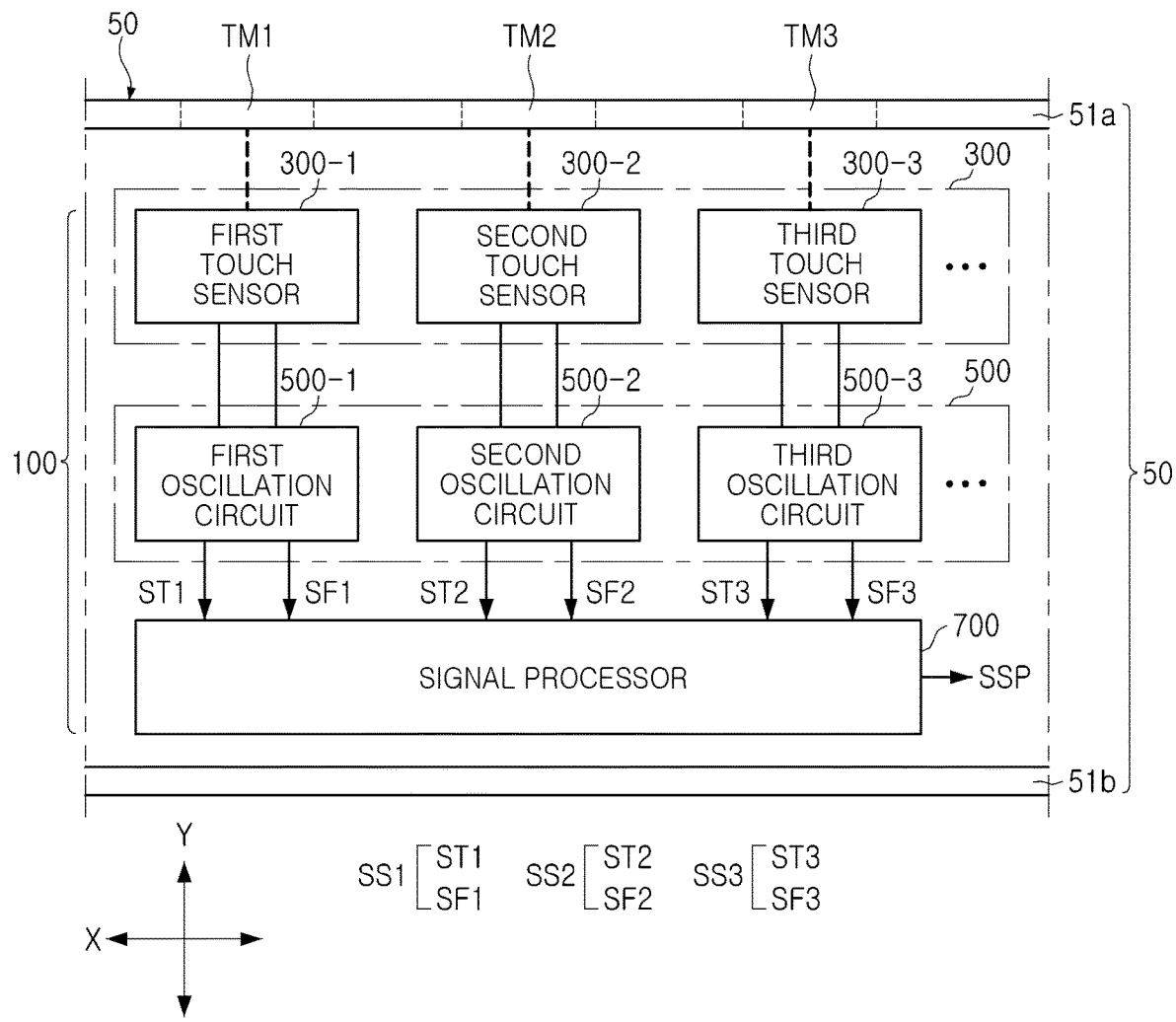
FIG. 4 is a view illustrating a touch sensing device according to an embodiment of the present disclosure.

FIG. 3 is a view illustrating a touch sensing device according to an embodiment of the present disclosure. FIG. 4 is a view illustrating a touch sensing device according to an embodiment of the present disclosure.

Referring to FIGS. 3 and 4, an electronic device 10 according to an embodiment of the present disclosure may include a housing 50 and a touch sensing device 100. The touch sensing device 100 may be disposed between an external cover 51a and an internal frame 51b of a side cover 51 disposed on the housing 50.

As described with reference to FIGS. 1 and 2, the housing 50 may include at least first and second touch members TM1 and TM2.

The touch sensing device 100 may include a touch sensing unit 300, an oscillation circuit unit 500, and a signal processor 700.

The touch sensing unit 300 may be disposed in the housing 50 of the electronic device 10, and may include a plurality of touch sensors 300-1, 300-2, . . . performing touch sensing, based on a touch applied to a plurality of touch members TM1, TM2, . . . .

The oscillation circuit unit 500 may generate a plurality of touch sensing signals SS1, SS2, . . . , based on the touch sensing of the touch sensing unit 300.

The signal processor 700 may perform a slide mode when a touch based on any one of the plurality of touch sensing signals SS1, SS2, . . . is a slide mode start touch to determine whether a slide touch pattern input based on the plurality of touch sensing signals SS1, SS2, . . . is a preset slide touch pattern, and may output a slide touch pattern signal SSP.

Referring to FIG. 3, a touch sensing unit 300 may be a hybrid sensor performing capacitive sensing and inductive sensing, based on a touch applied to a plurality of touch members, and may include first and second touch sensors 300-1 and 300-2.

Referring to FIG. 4, a touch sensing unit 300 may be a hybrid sensor performing capacitive sensing and inductive sensing, based on a touch applied to a plurality of touch members, and may include first, second, and third touch sensors 300-1, 300-2, and 300-3.

A first touch sensor 300-1 may be disposed in the housing 50 of the electronic device 10 to perform capacitive sensing and inductive sensing, based on a touch applied to a first touch member TM1.

A second touch sensor 300-2 may be disposed in the housing 50 of the electronic device 10 to perform capacitive sensing and inductive sensing, based on a touch applied to a second touch member TM2.

A third touch sensor 300-3 may be disposed in the housing 50 of the electronic device 10 to perform capacitive sensing and inductive sensing, based on a touch applied to a third touch member TM3.

As described above, the first, second, and third touch sensors 300-1, 300-2, and 300-3 may be hybrid touch sensors that perform both capacitive sensing and inductive sensing but are not be limited thereto. For example, the first, second, and third touch sensors 300-1, 300-2, and 300-3 may be a contact sensor, a force sensor, or a hybrid touch sensor, respectively.

An oscillation circuit unit 500 may include at least a first oscillation circuit 500-1 and a second oscillation circuit 500-2.

Referring to FIG. 4, an oscillation circuit unit 500 may include at least a first oscillation circuit 500-1, a second oscillation circuit 500-2, and a third oscillation circuit 500-3.

Referring to FIGS. 3 and 4, a first oscillation circuit 500-1 may generate a first contact sensing signal ST1 based on capacitive sensing of a first touch sensor 300-1 included in the touch sensing unit 300, and a first force sensing signal SF1 based on inductive sensing of the first touch sensor 300-1.

A second oscillation circuit 500-2 may generate a second contact sensing signal ST2 based on capacitive sensing of a second touch sensor 300-2 included in the touch sensing unit 300, and a second force sensing signal SF2 based on inductive sensing of the second touch sensor 300-2.

A third oscillation circuit 500-3 may generate a third contact sensing signal ST3 based on capacitive sensing of a third touch sensor 300-3 included in the touch sensing unit 300, and a third force sensing signal SF3 based on inductive sensing of the third touch sensor 300-3.

When the touch sensor of the present disclosure is a hybrid touch sensor, in the plurality of touch sensing signals SS1, SS2, . . . , a first touch sensing signal SS1 may include a first contact sensing signal ST1 based on capacitive sensing and a first force sensing signal SF1 based on inductive sensing. A second touch sensing signal SS2 may include a second contact sensing signal ST2 based on capacitive sensing and a second force sensing signal SF2 based on inductive sensing. A third touch sensing signal SS3 may include a third contact sensing signal ST3 based on capacitive sensing and a third force sensing signal SF3 based on inductive sensing.

When the touch sensor of the present disclosure is not a hybrid touch sensor, in the plurality of touch sensing signals SS1, SS2, . . . , a first touch sensing signal SS1 may include any one of a first contact sensing signal ST1 or a first force sensing signal SF1, a second touch sensing signal SS2 may include any one of a second contact sensing signal ST2 or a second force sensing signal SF2, and a third touch sensing signal SS3 may include any one of a third contact sensing signal ST3 or a third force sensing signal SF3.

Figure 5:
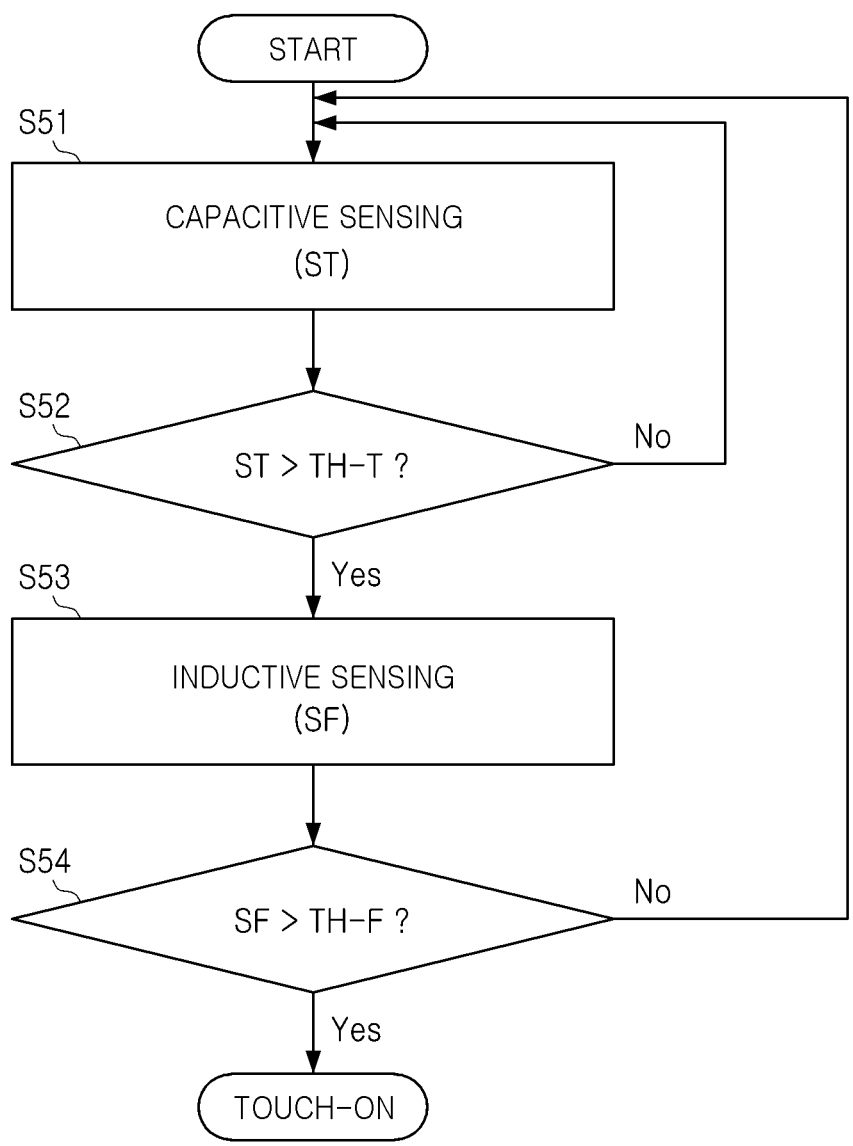
FIG. 5 is a flow chart illustrating an example of a touch sensing process of a signal processor.

FIG. 5 is a flow chart illustrating an example of a touch sensing process of a signal processor.

Referring to FIG. 5, in a signal processor 700, capacitive sensing may be performed to generate a contact sensing signal ST (S51). When a magnitude of the contact sensing signal ST exceeds an individual contact threshold value TH-T (S52), inductive sensing may be performed to generate a force sensing signal SF (S53). When a magnitude of the force sensing signal SF exceeds an individual force threshold value TH-F (S54), touch-on may be recognized, and whether a touch is normally applied may be recognized.

Figure 6:
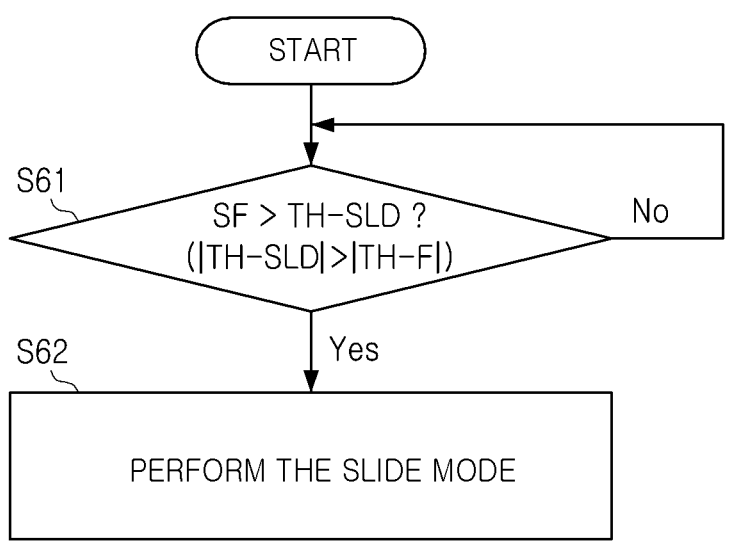
FIG. 6 is a flow chart illustrating an example of the progress of a slide mode.

FIG. 6 is a flow chart illustrating an example of the progress of a slide mode.

Referring to FIG. 6, if a plurality of touch sensors 300-1, 300-2, . . . are hybrid touch sensors, when a magnitude of one signal of a plurality of force sensing signals SF1, SF2, . . . exceeds a slide mode threshold value TH-SLD (S61), a signal processor 700 may determine an input force-touch as a slide mode start touch and may performs the slide mode (S62).

When there is no applied touch exceeding the slide mode threshold value TH-SLD, a slide mode may not be performed.

For example, the slide mode threshold value (|TH-SLD|, where the |TH-SLD| is an absolute value of TH-SLD) may be set to be higher than an individual force threshold (|TH-F|, where the |TH-F| is an absolute value of TH-F).

Figure 7:
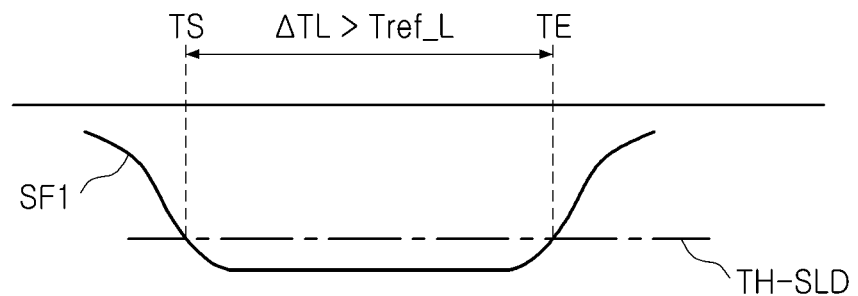
FIG. 7 is an illustrative diagram of an example of a determination for proceeding with a slide mode.

FIG. 7 is an illustrative diagram of an example of a determination for proceeding with a slide mode.

Referring to FIG. 7, if a plurality of touch sensors 300-1, 300-2, . . . are contact touch sensors or hybrid sensors, in order to ensure a more stable slide touch operation, when a retention time period ΔTL in which a force sensing signal exceeds a slide mode threshold value TH-SLD exceeds a retention reference time period Tref_L, a signal processor 700 may determine an input touch as a slide mode start touch.

For example, the slide mode threshold value TH-SLD may be an individual contact threshold value TH-T or an individual force threshold value TH-F.

If the plurality of touch sensors employed in the present disclosure are hybrid sensors, in order to ensure more stability for entry into a slide mode, the slide mode may be entered when the following two conditions are satisfied at the same time.
(1) When a magnitude of a force sensing signal exceeds a slide mode threshold value (|TH-SLD|, where the |TH-SLD| is an absolute value of TH-SLD); and
(2) When a retention time period ΔTL exceeding a slide mode threshold value TH-SLD exceeds a retention reference time period Tref_L.

Figure 8:
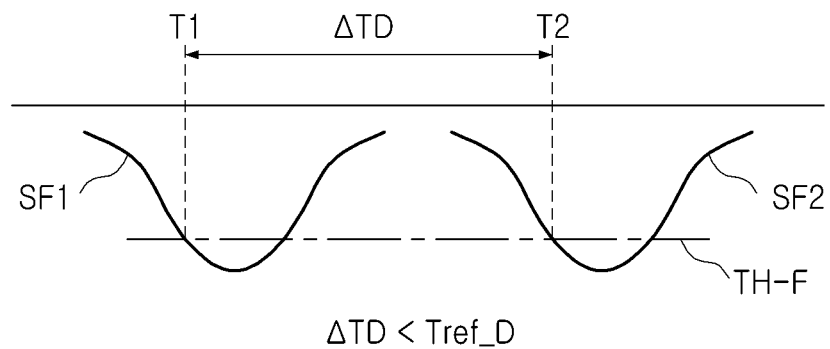
FIG. 8 is an illustrative diagram of an example of a slide determination while performing a slide mode.

FIG. 8 is an illustrative diagram of an example of a slide determination while performing a slide mode.

Referring to FIG. 8, a signal processor 700, while performing a slide mode, may recognize two consecutive touches as a slide touch when a time period ΔTD between the two consecutive touches is within a slide touch reference time period Tref_D.

Figure 9:
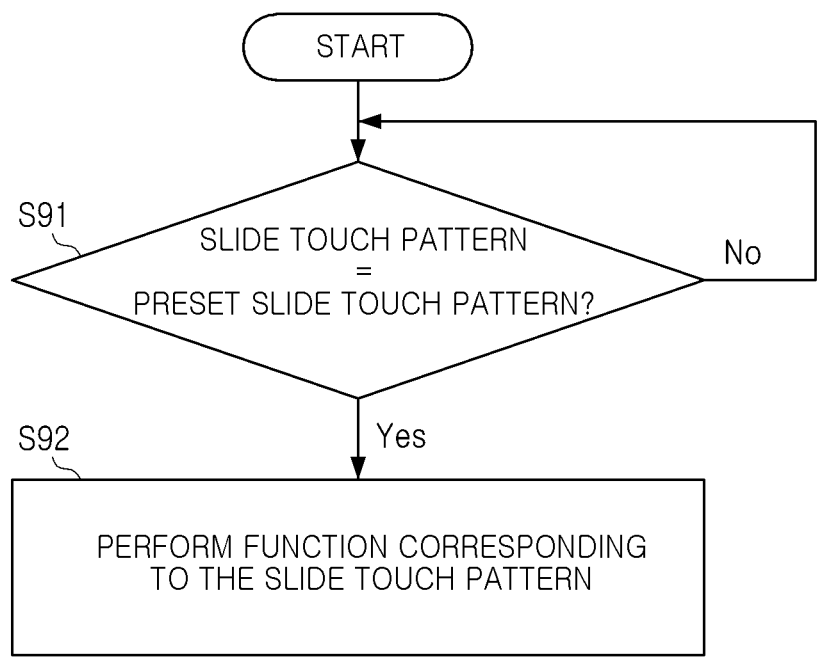
FIG. 9 is a view illustrating an example of a processing for a slide touch pattern.
Figure 10:
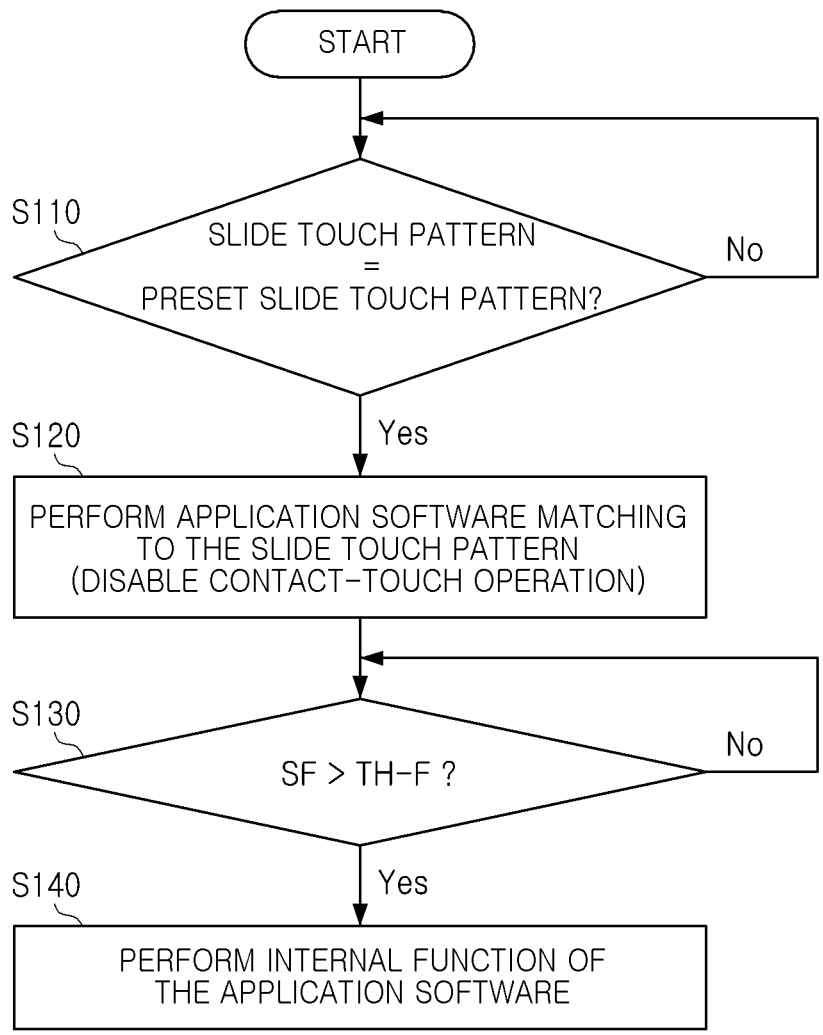
FIG. 10 is a view illustrating an example of a processing for a slide touch pattern.

FIG. 9 is a view illustrating an example of a processing for a slide touch pattern, and FIG. 10 is a view illustrating an example of a processing for a slide touch pattern.

Referring to FIGS. 9 and 10, while performing a slide mode, when a slide touch pattern is a preset slide touch pattern (S91 or S110), a signal processor 700 may perform a function corresponding to the slide touch pattern (S92 or S120). For example, the function corresponding to the slide touch pattern may be a function of disabling an operation related to a contact-touch, an emergency rescue function for an emergency situation, a function of performing a specific application software (e.g., camera app, etc.), or the like, but is not limited thereto.

Referring to FIG. 10, if the slide touch pattern is performed with an application software matched to a preset slide touch pattern (S120), when a magnitude of a force sensing signal SF exceeds an individual force threshold value TH-F (S130), an internal function of the corresponding application software may be performed (S140).

In an example, the executed application software may be a camera application software. In this case, while the camera application software is executed, a sensing operation according to a contact-touch may be disabled, and a camera internal function may be performed, as a force-touch is applied.

Figure 11A:
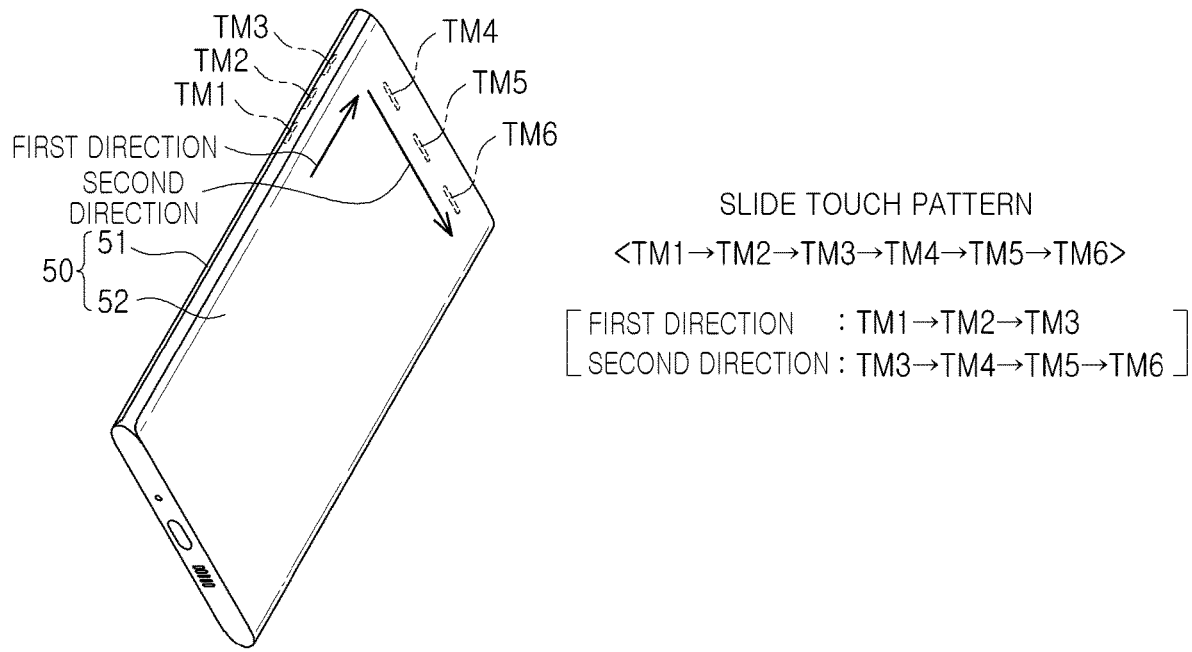
FIGS. 11A and 11B are views illustrating examples of an arrangement of touch members.
Figure 11B:
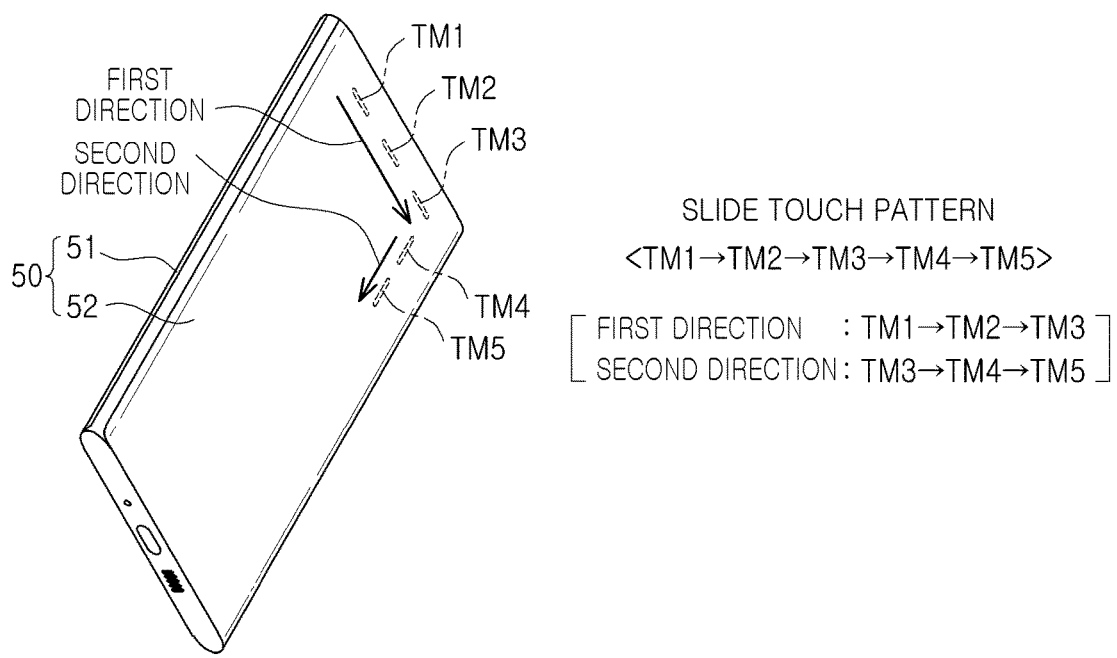

FIGS. 11A and 11B are views illustrating examples of an arrangement of touch members.

FIG. 11A is a view illustrating an example of an arrangement of a plurality of touch members TM1 to TM6.

Referring to FIG. 11A, a first touch member TM1, a second touch member TM2, and a third touch member TM3 may be arranged on a side cover 51 of a housing 50, and a fourth touch member TM4, a fifth touch member TM5, and a sixth touch member TM6 may be arranged on a rear cover 52 of the housing 50.

For example, in FIG. 11A, a slide touch pattern may include a slide touch in a first direction in which the first touch member TM1, the second touch member TM2, and the third touch member TM3 are sequentially arranged in one direction, and a slide touch in a second direction in which the fourth touch member TM4, the fifth touch member TM5, and the sixth touch member TM6 are sequentially arranged in another direction.

FIG. 11B is a view illustrating an example of an arrangement of a plurality of touch members TM1 to TM5.

Referring to FIG. 11B, a first touch member TM1, a second touch member TM2, and a third touch member TM3 may be arranged on a rear cover 52 of a housing 50 in one direction, and a fourth touch member TM4 and a fifth touch member TM5 may be arranged on the rear cover 52 of the housing 50 in the other direction.

For example, in FIG. 11B, a slide touch pattern may include a slide touch in a first direction in which the first touch member TM1, the second touch member TM2, and the third touch member TM3 are sequentially arranged in one direction, and a slide touch in a second direction in which the fourth touch member TM4 and the fifth touch member TM5 are sequentially arranged in another direction.

Figure 12:
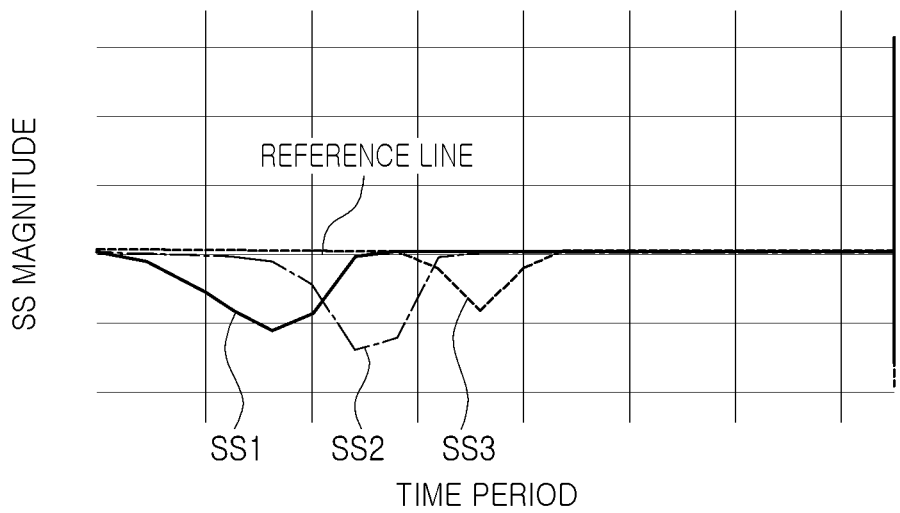
FIG. 12 is a view illustrating an example of a slide touch pattern 1.
Figure 13:
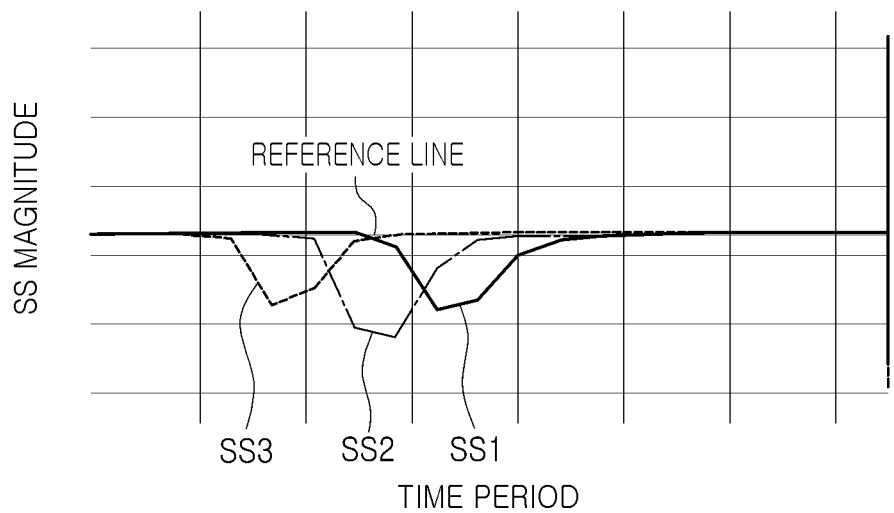
FIG. 13 is a view illustrating an example of a slide touch pattern 2.
Figure 14:
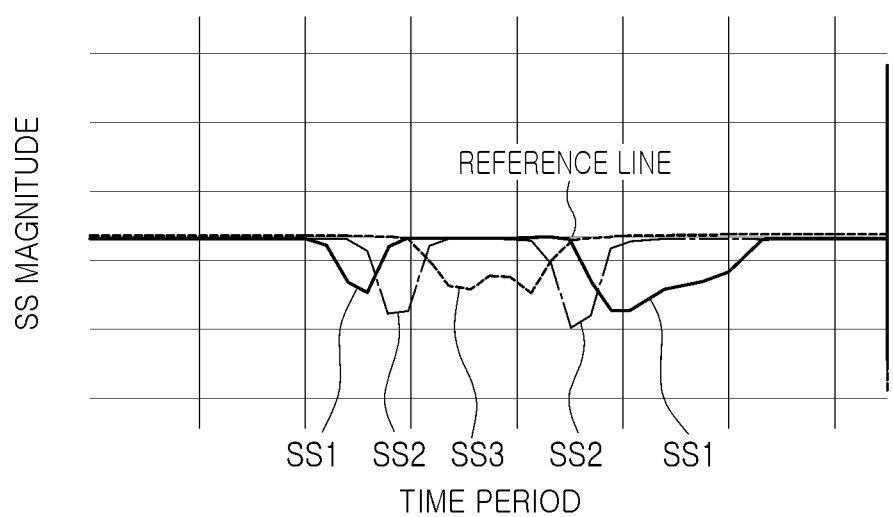
FIG. 14 is a view illustrating an example of a slide touch pattern 3.

FIG. 12 is a view illustrating an example of a slide touch pattern 1, FIG. 13 is a view illustrating an example of a slide touch pattern 2, and FIG. 14 is a view illustrating an example of a slide touch pattern 3.

Referring to FIG. 12, for example, a first touch sensing signal SS1, a second touch sensing signal SS2, and a third touch sensing signal SS3 may be sequentially generated, by a slide touch pattern 1 in which a first touch member TM1, a second touch member TM2, and a third touch member TM3 are sequentially touched.

Referring to FIG. 13, for example, a third touch sensing signal SS3, a second touch sensing signal SS2, and a first touch sensing signal SS1 may be sequentially generated, by a slide touch pattern 2 in which a third touch member TM3, a second touch member TM2, and a first touch member TM1 are sequentially touched.

Referring to FIG. 14, for example, a first touch sensing signal SS1, a second touch sensing signal SS2, a third touch sensing signal SS3, the second touch sensing signal SS2, and the first touch sensing signal SS1 may be sequentially generated, by a slide touch pattern 3 in which a first touch member TM1, a second touch member TM2, a third touch member TM3, the second touch member TM2, and the first touch member TM1 are sequentially touched.

The slide touch pattern 3 may include a slide touch in a first direction in which the first touch member TM1, the second touch member TM2, and the third touch member TM3 are sequentially touched in one direction, and a slide touch in a second direction in which the third touch member TM3, the second touch member TM2, and the first touch member TM1 are sequentially touched in the other direction.

As described above, the preset slide touch pattern may include a slide touch in a first direction, including at least two touch sensing, and a slide touch in a second direction, including at least two touch sensing and different from the first direction.

Figure 15:
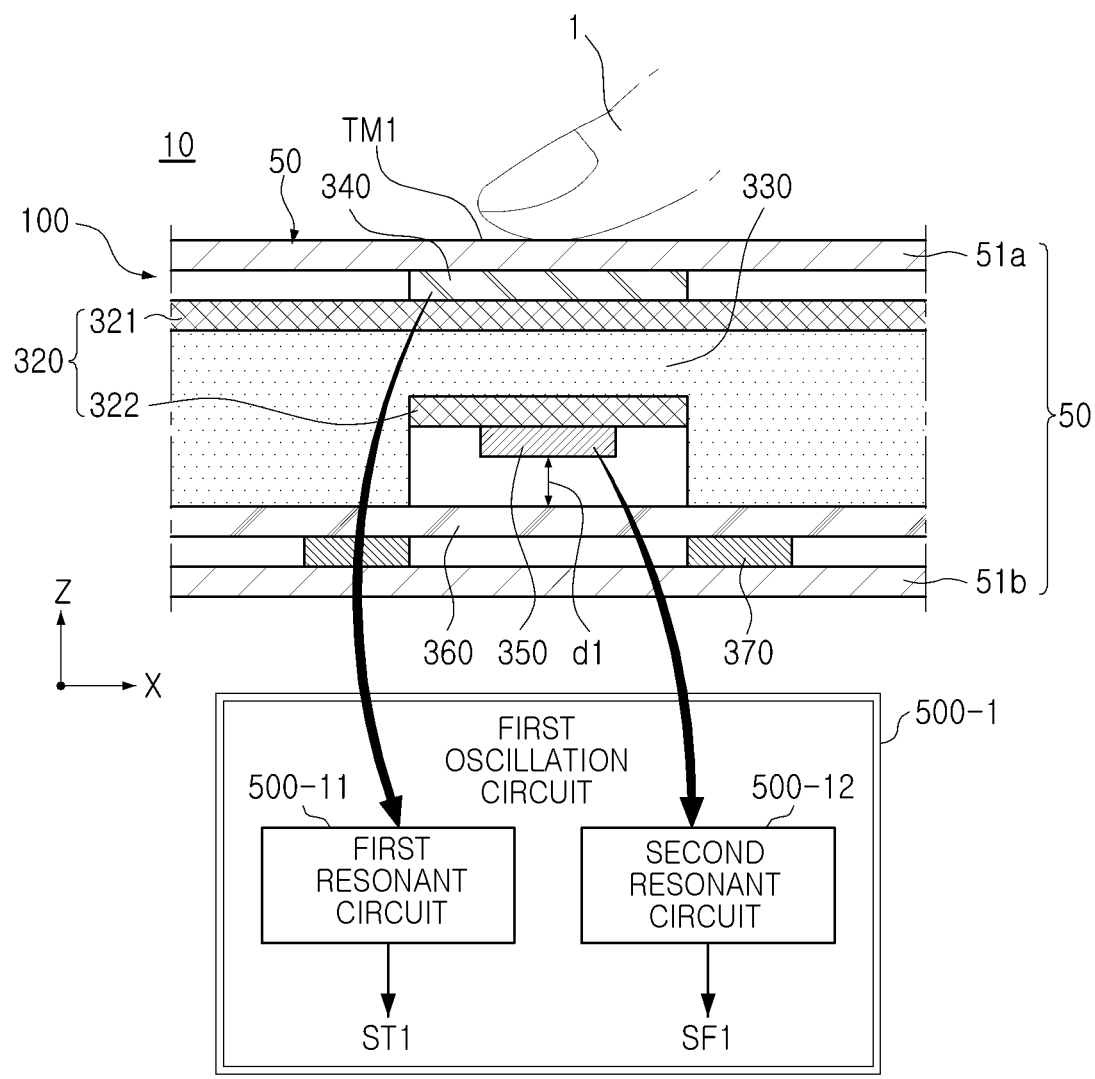
FIG. 15 is a view illustrating an example of a touch sensing device.

FIG. 15 is a view illustrating an example of a touch sensing device.

Referring to FIG. 15, a touch sensing device 100 (e.g., FIGS. 3 and 4) may include a plurality of touch sensors 300-1, 300-2, . . . .

Each of the plurality of touch sensors 300-1, 300-2, . . . may include an insulating member 330, a capacitive pad 340, a sensing coil 350, and a conductor member 360.

The insulating member 330 may be disposed in the housing 50.

The capacitive pad 340 may be mounted on a first substrate 321 disposed on one side of the insulating member 330 opposing a housing 50, to sense a contact-touch through a plurality of touch members TM1, TM2, . . . .

The sensing coil 350 may be mounted on a second substrate 322 disposed on the other side of the insulating member 330. The second substrate 322 may be electrically connected to the first substrate 321 to sense a force-touch through the plurality of touch members TM1, TM2, . . . . For example, the first substrate 321 and the second substrate 322 may be electrically connected to each other as separate substrates. The first substrate 321 and the second substrate 322 may also be made as a single substrate 320. As the substrate 320, one of the commonly known PCB substrates may be used but is not limited to a specific substrate.

The conductor member 360 may be spaced apart from the sensing coil 350 by a predetermined distance d1 for force sensing through the sensing coil 350.

In FIG. 15, first, a process of sensing the contact-touch through the plurality of touch members TM1, TM2, . . . will be described.

When any one of the plurality of touch members TM1, TM2, . . . is contact-touched, capacitance between the capacitive pad 340 and a human body to be contact-touched may be formed in parallel with capacitance of a capacitor component mounted on the first substrate 321. Therefore, a total capacitance value may increase and a resonant frequency of a first resonant circuit 500-11 may decrease, to generate a first contact sensing signal ST1 having a reduced resonant frequency.

Next, a process of sensing the force-touch through the plurality of touch members TM1, TM2, . . . will be described.

When any one of the plurality of touch members TM1, TM2, . . . is force-touched, the predetermined distance d1 between the sensing coil 350 and the conductor member 360 may be changed, to be affected by an eddy current between the sensing coil 350 and the conductor member 360. Therefore, an inductance value of the sensing coil 350 mounted on the second substrate 322 may decrease, and a resonance frequency of the second resonance circuit 500-12 may increase, to generate a first force sensing signal SF1 having an increased resonant frequency.

Figure 16:
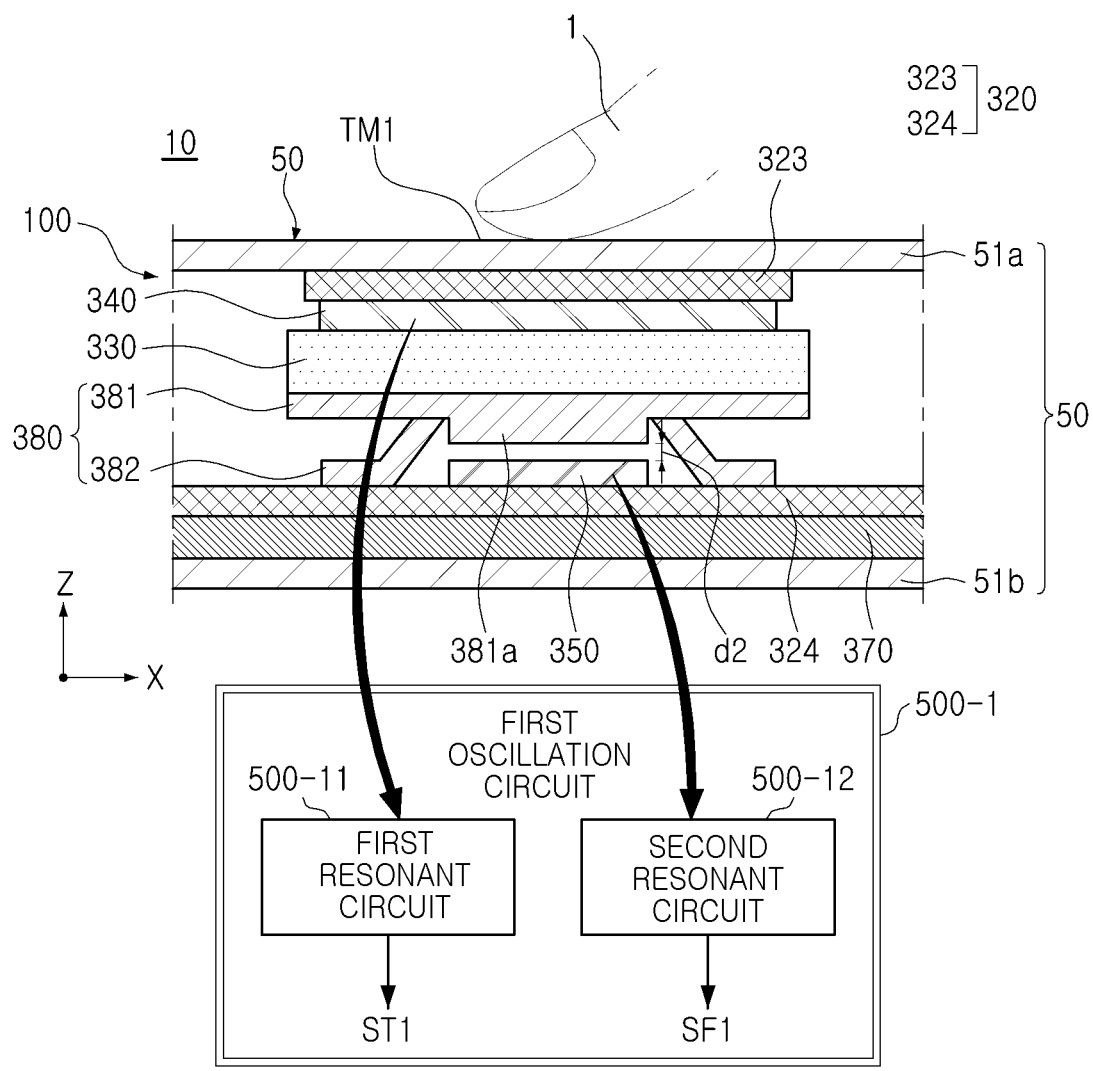
FIG. 16 is a view illustrating a an example of touch sensing device.

FIG. 16 is a view illustrating an example of a touch sensing device.

Referring to FIG. 16, a touch sensing device 100 (e.g., FIGS. 3 and 4) may include a plurality of touch sensors 300-1, 300-2, . . . .

Each of the plurality of touch sensors 300-1, 300-2, . . . may include an insulating member 330, a capacitive pad 340, a conductor member 380, and a sensing coil 350.

The insulating member 330 may be disposed to be opposite to an inner side of a housing 50, and may include one surface opposing the inner side of the housing 50.

The capacitive pad 340 may be mounted on a first substrate 323 disposed on the inner surface of the housing 50, and may be disposed between the first substrate 323 and the insulating member 330, to sense a contact-touch through a plurality of touch members TM1, TM2, . . . .

The conductor member 380 may be disposed on the other surface of the insulating member 330.

The sensing coil 350 may be spaced apart from the conductor member 380 by a predetermined distance d2 to be mounted on a second substrate 324, and the second substrate 322 may be electrically connected to the first substrate 321, to sense a force-touch through the plurality of touch members TM1, TM2, . . . .

In FIG. 16, first, a process of sensing the contact-touch through the plurality of touch members TM1, TM2, . . . will be described.

When any one of the plurality of touch members TM1, TM2, . . . is contact-touched, capacitance between the capacitive pad 340 and a human body to be contact-touched may be formed in parallel with capacitance of a capacitor component mounted on the first substrate 321. Therefore, a total capacitance value may increase and a resonant frequency of a first resonant circuit 500-11 may decrease, to generate a first contact sensing signal ST1 having a reduced resonant frequency.

Next, a process of sensing the force-touch through the plurality of touch members TM1, TM2, . . . will be described.

When any one of the plurality of touch members TM1, TM2, . . . is force-touched, the predetermined distance d1 between the sensing coil 350 and the conductor member 360 may be changed, to be affected by an eddy current between the sensing coil 350 and the conductor member 360. Therefore, an inductance value of the sensing coil 350 mounted on the second substrate 322 may decrease, and a resonance frequency of the second resonance circuit 500-12 may increase, to generate a first force sensing signal SF1 having an increased resonant frequency.

FIGS. 15 and 16 are examples of a case in which a touch sensor applicable to the present disclosure is a hybrid touch sensor, but the present disclosure is not limited thereto.

Figure 17:
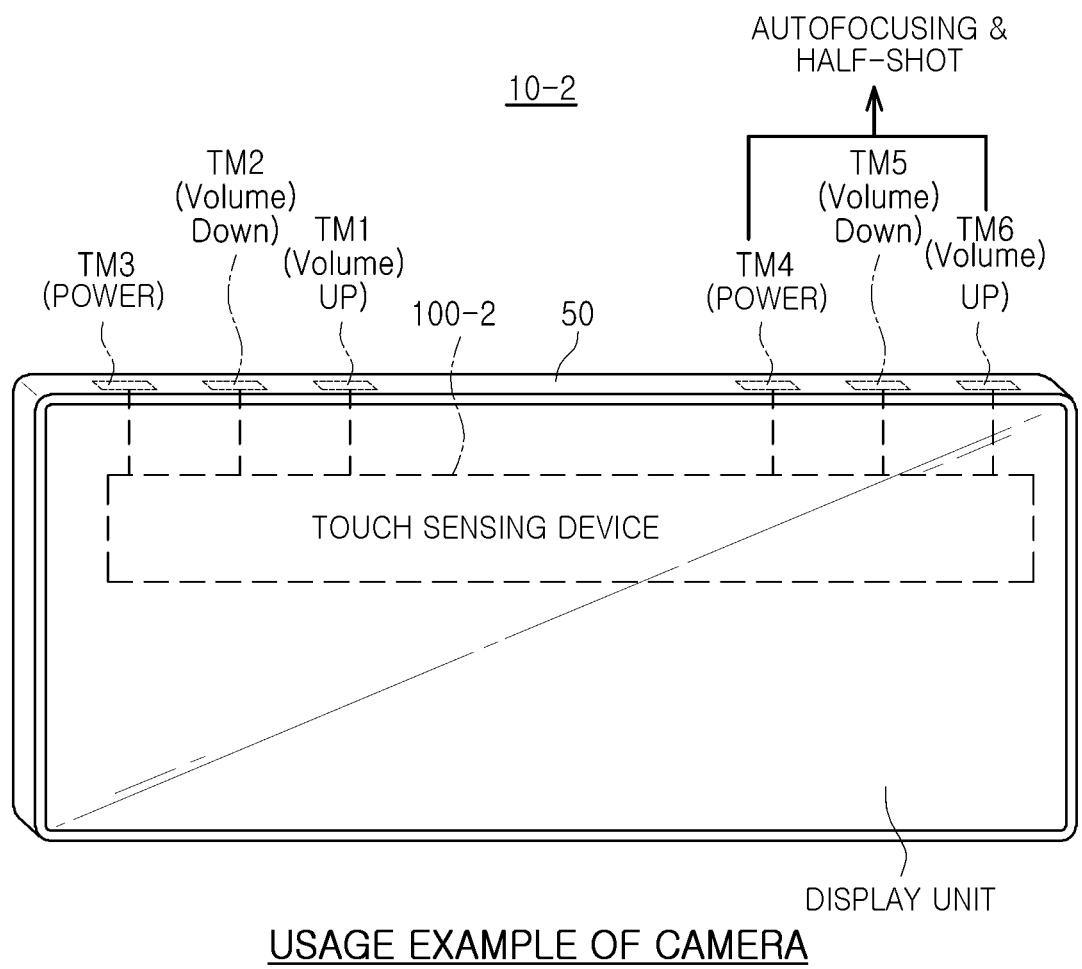
FIG. 17 is a view illustrating a first usage example of applying the slide touch pattern of FIG. 10.
Figure 18:
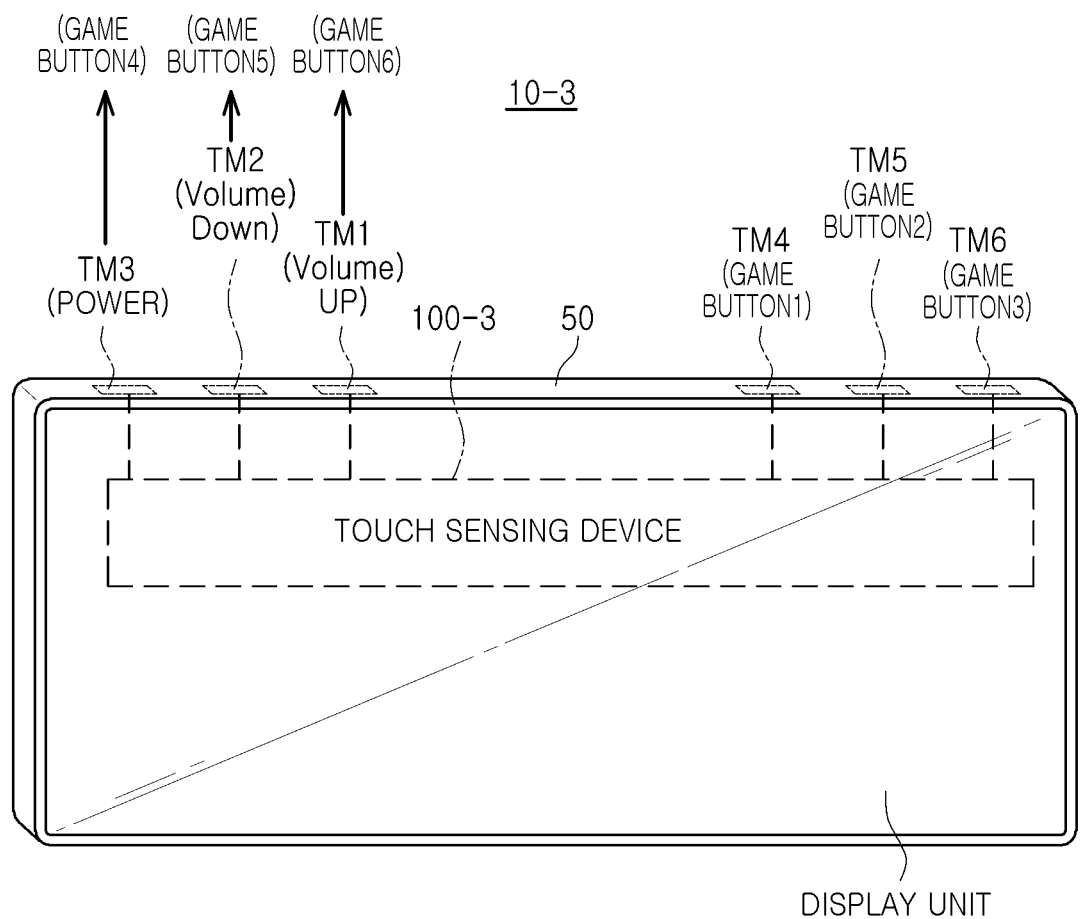
FIG. 18 is a view illustrating a second usage example of applying the slide touch pattern of FIG. 10.

FIG. 17 is a view illustrating a first usage example of applying the slide touch pattern of FIG. 10, and FIG. 18 is a view illustrating a second usage example of applying the slide touch pattern of FIG. 10.

Referring to FIG. 17, for example, when an electronic device 10-2 includes a plurality of first to sixth touch members TM1, TM2, . . . , and TM6, a touch sensing device 100-2 corresponding to each of the plurality of first to sixth touch members TM1, TM2, . . . , and TM6 may be included.

In the touch sensing device 100-2, when a slide touch pattern generated by sequentially touching the first, second, and third touch members TM1, TM2, and TM3 (e.g., volume up, volume down, and power) is a preset camera mode, execution of a corresponding camera application software may be processed. In this example, a flash function may be processed through the fourth touch member TM4, a zoom function may be processed through the fifth touch member TM5, and a camera shutter function may be processed through the sixth touch member TM6.

In this case, in the zoom function and the camera shutter function, an auto-focusing function and a half-shot function may be implemented using a change amount in inductance during inductive sensing of the present disclosure.

Referring to FIG. 18, for example, when an electronic device 10-3 includes a plurality of first to sixth touch members TM1, TM2, . . . , and TM6, a touch sensing device 100-3 corresponding to each of the plurality of first to sixth touch members TM1, TM2, . . . , and TM6 may be included.

In the touch sensing device 100-3, when a slide touch pattern generated by sequentially touching the first, second, and third touch members TM1, TM2, and TM3 (e.g., volume up, volume down, and power) is a preset camera mode, execution of a corresponding camera application software may be processed. In this case, functions respectively corresponding to corresponding game buttons 1 to 6 may be processed through the plurality of first to sixth touch members TM1, TM2, . . . , TM6, respectively.

A circuit unit including an oscillation circuit and a signal processor of a touch sensing device according to an embodiment of the present disclosure may be implemented with a computing environment in which a processor (e.g., a central processing unit (CPU), a graphic processing unit (GPU)), a microprocessor, an application specific integrated circuit (ASIC), a field programmable gate array (FPGA), and the like), a memory (e.g., a volatile memory (e.g., a RAM, and the like), a non-volatile memory (e.g., a ROM, a flash memory, and the like), and the like), an input device (e.g., a keyboard, a mouse, a pen, a voice input device, a touch input device, an infrared camera, a video input device, and the like), an output device (e.g., a display, a speaker, a printer, and the like), and a communication connection device (e.g., a modem, a network interface card (NIC), an integrated network interface, a radio frequency transmitter/receiver, an infrared port, a USB connection device, and the like) are interconnected with each other (e.g., a peripheral component interconnection (PCI), a USB, a firmware (IEEE 1394), an optical bus structure, a network, and the like).

The computing environment may be implemented in a distributed computing environment including a personal computer, a server computer, a handheld or laptop device, a mobile device (a mobile phone, a PDA, a media player, and the like), a multiprocessor system, a consumer electronics, a mini computer, a mainframe computer, any of the aforementioned systems or a device, but is not limited thereto.

According to an embodiment of the present disclosure, there may be advantages of recognize a pattern of a slide touch by performing a slide mode using a plurality of touch sensors, improving convenience of life by a user interface (UX) environment capable of recognizing patterns of a variety of slide touches, and having high efficiency capable of raising a value of a product to the next level.

The first touch sensor, second touch sensor, third touch sensor, first oscillation circuit, second oscillation circuit, third oscillation circuit, signal processor, first oscillation circuit, first resonant circuit, second resonant circuit, and touch sensing device in FIGS. 1-18 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-18 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A touch sensing device employed in an electronic device having a housing including a plurality of touch members, comprising:
   a touch sensing unit disposed in the housing and including a plurality of touch sensors configured to perform touch sensing based on a touch applied to any one or any two or more of the plurality of touch members;
   an oscillation circuit unit configured to generate a plurality of touch sensing signals based on the touch sensing; and
   a signal processor configured to:
     perform a slide mode, when any one of the plurality of touch sensing signals is a slide mode start touch, to determine whether a slide touch pattern input based on the plurality of touch sensing signals is a preset slide touch pattern,
   wherein the touch sensing unit is further configured to perform capacitive sensing and inductive sensing based on a touch applied to the plurality of touch members,
   the oscillation circuit unit is further configured to generate a plurality of contact sensing signals based on the capacitive sensing, and a plurality of force sensing signals based on the inductive sensing, and
   the signal processor is further configured to determine an input force-touch as the slide mode start touch when a magnitude of any one of the plurality of force sensing signals exceeds a slide mode threshold value.

2. The touch sensing device of claim 1, wherein the oscillation circuit unit comprises either one or both of a first oscillation circuit and a second oscillation circuit,
   wherein the first oscillation circuit is configured to generate a first contact sensing signal based on capacitive sensing of a first touch sensor included in the touch sensing unit, and a first force sensing signal based on inductive sensing of the first touch sensor, and
   the second oscillation circuit is configured to generate a second contact sensing signal based on capacitive sensing of a second touch sensor included in the touch sensing unit, and a second force sensing signal based on inductive sensing of the second touch sensor.

3. The touch sensing device of claim 1, wherein the slide mode threshold value is set to be higher than an individual force threshold value.

4. The touch sensing device of claim 1, wherein the signal processor is further configured to determine an input touch as the slide mode start touch when a retention time period in which an input touch sensing signal, exceeding the slide mode threshold value, exceeds a retention reference time period.

5. The touch sensing device of claim 1, wherein the signal processor is further configured to perform a function matching the slide touch pattern input, when the slide touch pattern input is the preset slide touch pattern, while performing the slide mode.

6. The touch sensing device of claim 1, wherein the touch sensing device is configured to process
   execution of a corresponding camera application software, and
   any one or any two or more of a flash function, a zoom function, and a camera shutter function, as a camera function based on a touch to a subset of the plurality of touch members, when the slide touch pattern input corresponds to a preset camera mode, while performing the slide mode.

7. The touch sensing device of claim 1, wherein the touch sensing device is configured to process
   execution of a corresponding game application software, and
   a corresponding function of a corresponding game based on a touch to a subset of the plurality of touch members, when the slide touch pattern input corresponds to a preset game mode, while performing the slide mode.

8. The touch sensing device of claim 1, wherein each of the plurality of touch sensors comprises:
an insulating member disposed in the housing;
a capacitive pad mounted on a first substrate disposed on one side of the insulating member opposing the housing, and configured to sense a contact-touch through the plurality of touch members;
a sensing coil mounted on a second substrate, disposed on another side of the insulating member, configured to sense a force-touch through the plurality of touch members, wherein the second substrate is electrically connected to the first substrate; and
a conductor member spaced apart from the sensing coil by a predetermined interval for force sensing through the sensing coil.

9. The touch sensing device of claim 1, wherein each of the plurality of touch sensors comprises:
an insulating member disposed opposite to an inner side of the housing and including one surface opposing the inner side of the housing;
a capacitive pad mounted on a first substrate disposed on an inner surface of the housing and disposed between the first substrate and the insulating member to sense a contact-touch through the plurality of touch members;
a conductor member disposed on another surface of the insulating member; and
a sensing coil spaced apart from the conductor member, disposed on a second substrate, configured to sense a force-touch through the plurality of touch members, wherein the second substrate is electrically connected to the first substrate.

10. An electronic device comprising:
a housing including a plurality of touch members;
a touch sensing unit, disposed in the housing, comprising a plurality of touch sensors configured to perform touch sensing based on a touch applied to any one or any two or more of the plurality of touch members;
an oscillation circuit unit configured to generate a plurality of touch sensing signals based on the touch sensing; and
a signal processor configured to:
perform a slide mode, when any one of the plurality of touch sensing signals is a slide mode start touch, to determine whether a slide touch pattern input based on the plurality of touch sensing signals is a preset slide touch pattern,
wherein the touch sensing unit is further configured to perform capacitive sensing and inductive sensing, based on a touch applied to the plurality of touch members,
the oscillation circuit unit is further configured to generate a plurality of contact sensing signals based on the capacitive sensing, and a plurality of force sensing signals based on the inductive sensing, and
the signal processor is further configured to determine an input force-touch as the slide mode start touch, when a magnitude of any one of the plurality of force sensing signals exceeds a slide mode threshold value.

11. The electronic device of claim 10, wherein the oscillation circuit unit comprises either one or both of a first oscillation circuit and a second oscillation circuit,
wherein the first oscillation circuit is configured to generate a first contact sensing signal based on capacitive sensing of a first touch sensor included in the touch sensing unit, and a first force sensing signal based on inductive sensing of the first touch sensor, and
the second oscillation circuit is configured to generate a second contact sensing signal based on capacitive sensing of a second touch sensor included in the touch sensing unit, and a second force sensing signal based on inductive sensing of the second touch sensor.

12. The electronic device of 10, wherein the slide mode threshold value is set to be higher than an individual force threshold value.

13. The electronic device of claim 10, wherein the signal processor is further configured to determine an input touch as the slide mode start touch when a retention time period in which an input touch sensing signal, exceeding the slide mode threshold value, exceeds a retention reference time period.

14. The electronic device of claim 10, wherein the signal processor is further configured to perform a function matching the slide touch pattern input, when the slide touch pattern input is the preset slide touch pattern, while performing the slide mode.

15. The electronic device of claim 10, wherein the touch sensing device is configured to process
execution of a corresponding camera application software, and
any one or any two or more of a flash function, a zoom function, and a camera shutter function, as a camera function based on a touch to a subset of the plurality of touch members, when the slide touch pattern input corresponds to a preset camera mode, while performing the slide mode.

16. The electronic device of claim 10, wherein the touch sensing device is configured to process
execution of a corresponding game application software, and
a corresponding function of a corresponding game based on a touch to a subset of the plurality of touch members, when the slide touch pattern input corresponds to a preset game mode, while performing the slide mode.

17. The electronic device of claim 10, wherein each of the plurality of touch sensors comprises:
an insulating member disposed in the housing;
a capacitive pad mounted on a first substrate disposed on one side of the insulating member opposing the housing, and configured to sense a contact-touch through the plurality of touch members;
a sensing coil mounted on a second substrate, disposed on another side of the insulating member, configured to sense a force-touch through the plurality of touch members, wherein the second substrate is electrically connected to the first substrate; and
a conductor member spaced apart from the sensing coil by a predetermined interval for force sensing through the sensing coil.

18. The electronic device of claim 10, wherein each of the plurality of touch sensors comprises:
an insulating member disposed opposite to an inner side of the housing and including one surface opposing the inner side of the housing;
a capacitive pad mounted on a first substrate disposed on an inner surface of the housing and disposed between the first substrate and the insulating member to sense a contact-touch through the plurality of touch members;
a conductor member disposed on another surface of the insulating member; and a sensing coil spaced apart from the conductor member, disposed on a second substrate, configured to sense a force-touch through the plurality of touch members, wherein the second substrate is electrically connected to the first substrate.

\* \* \* \* \*